(No Model.)   5 Sheets—Sheet 1.
H. S. PARK.
MOTOR FOR STREET CARS.
No. 528,796.   Patented Nov. 6, 1894.
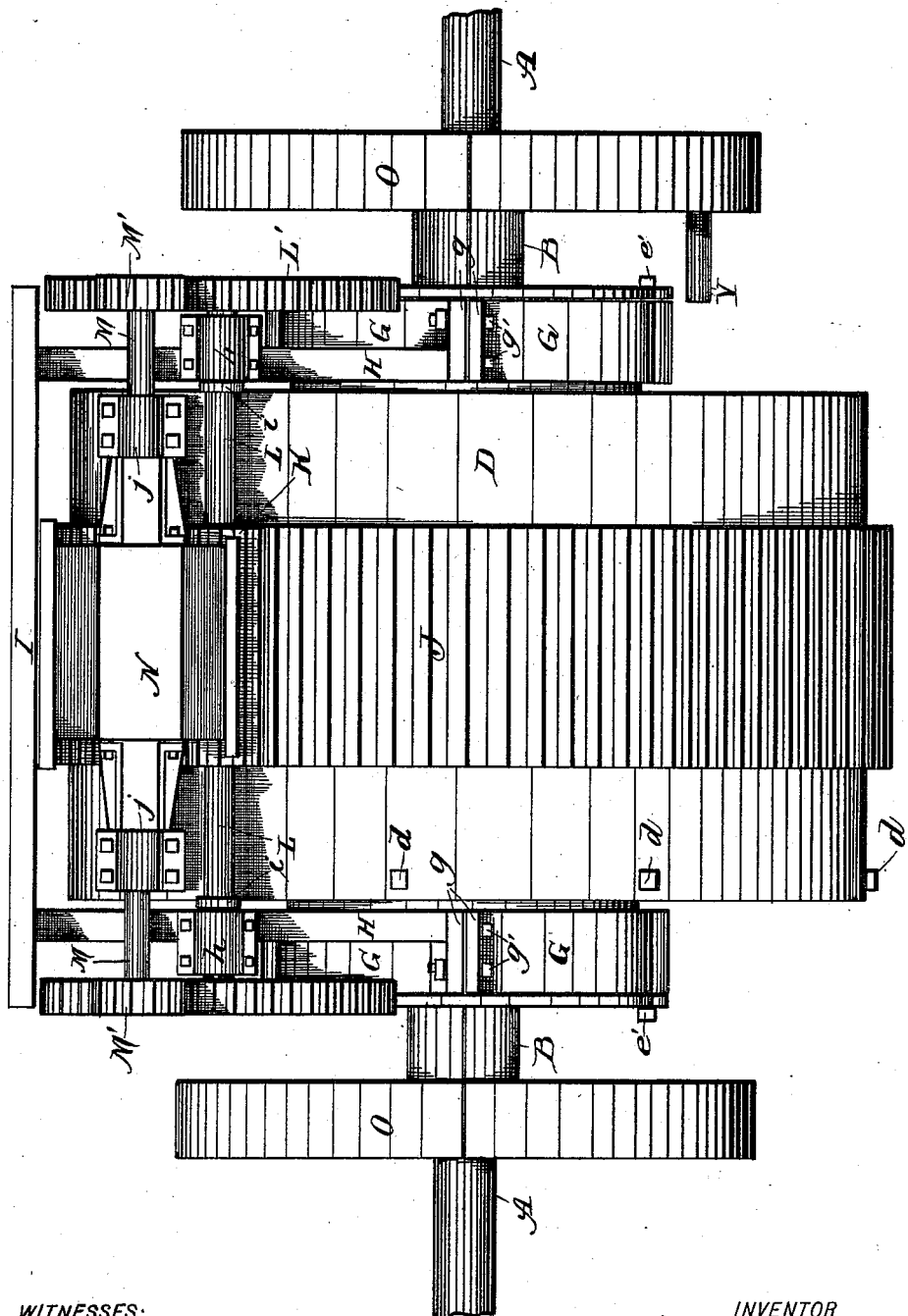
WITNESSES:
INVENTOR

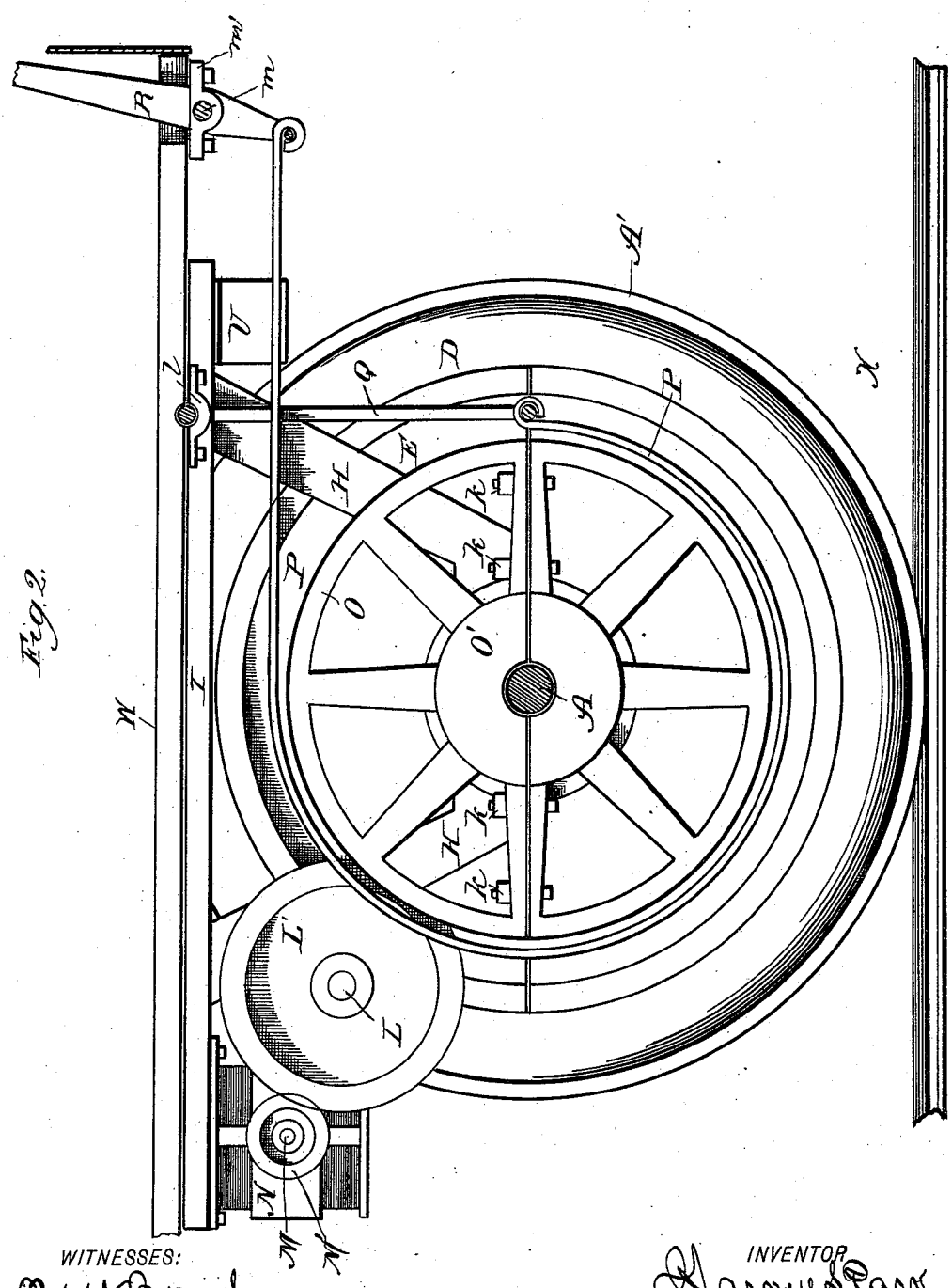

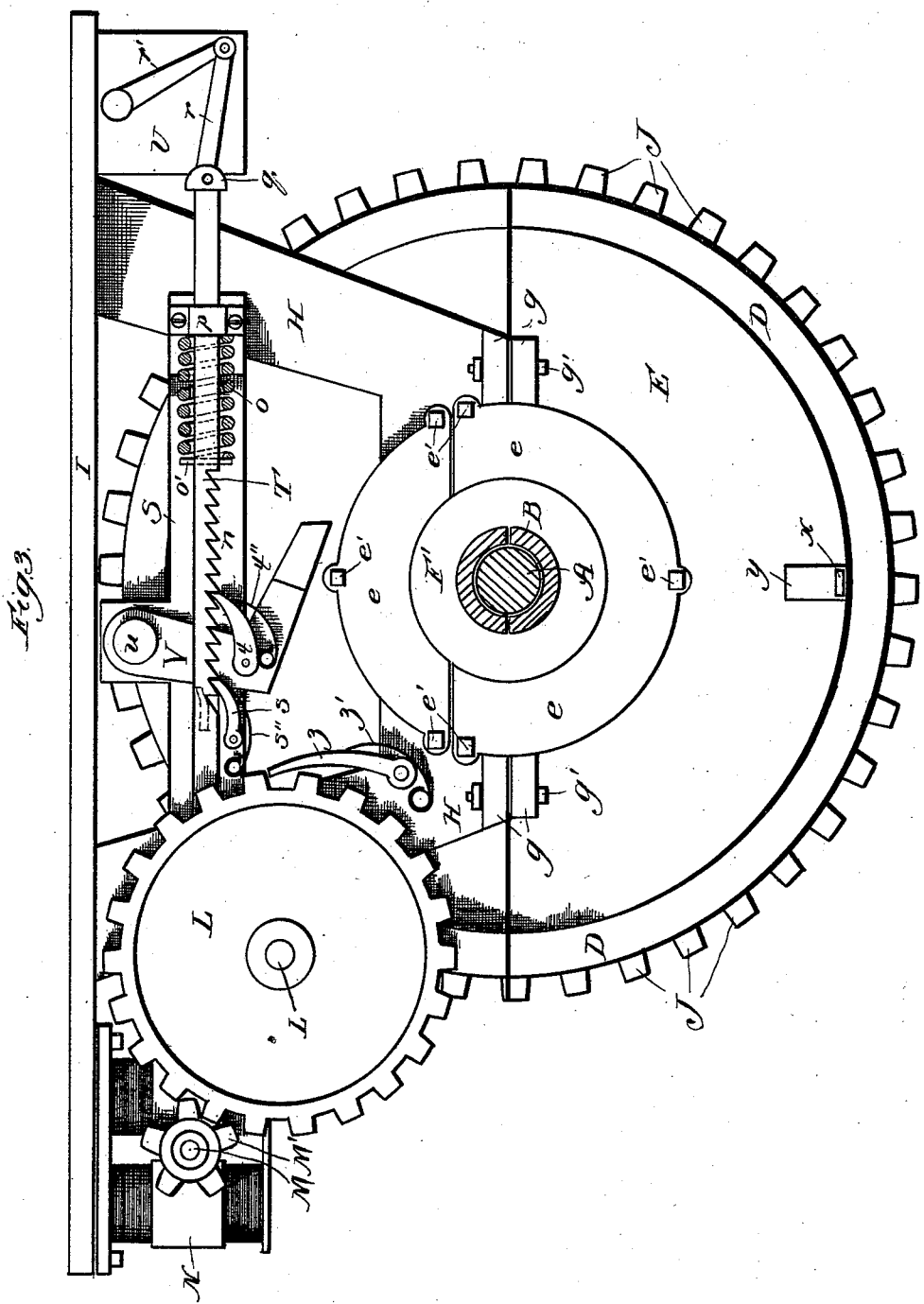

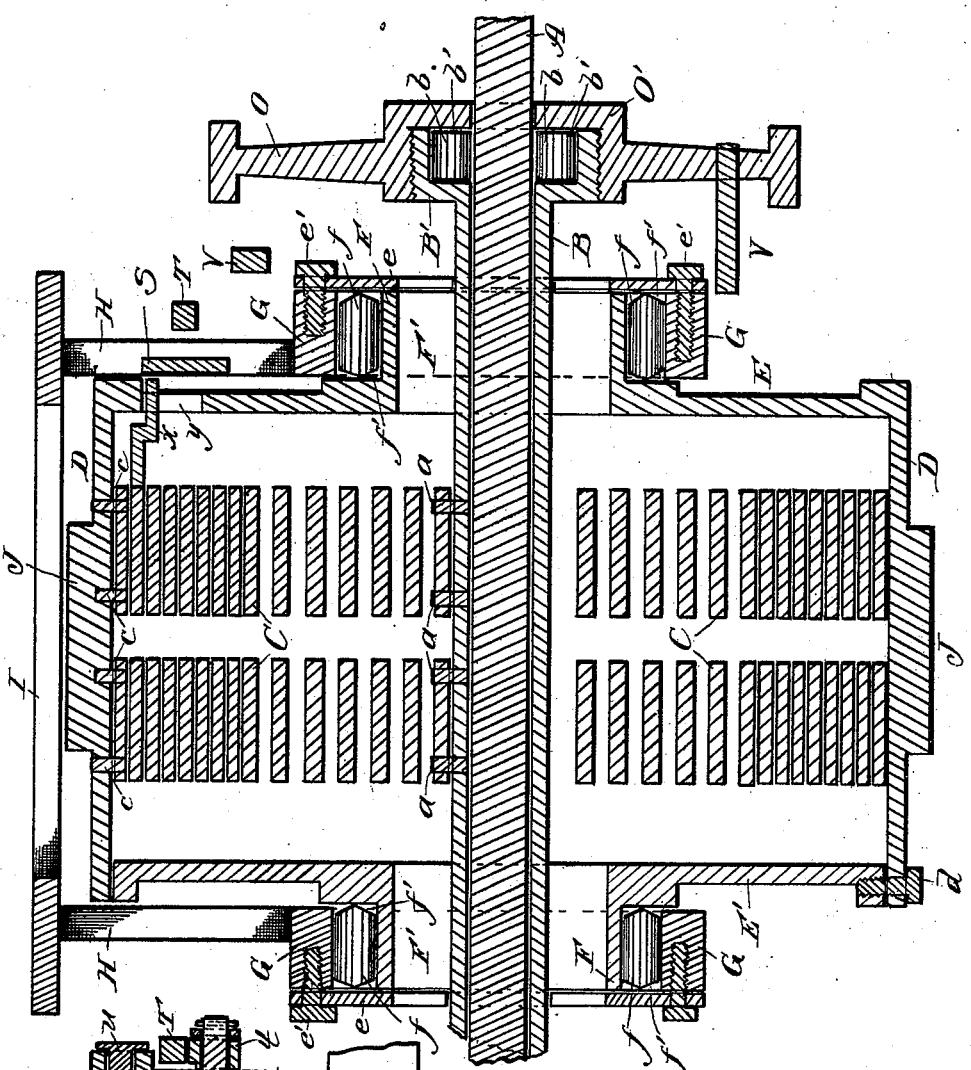

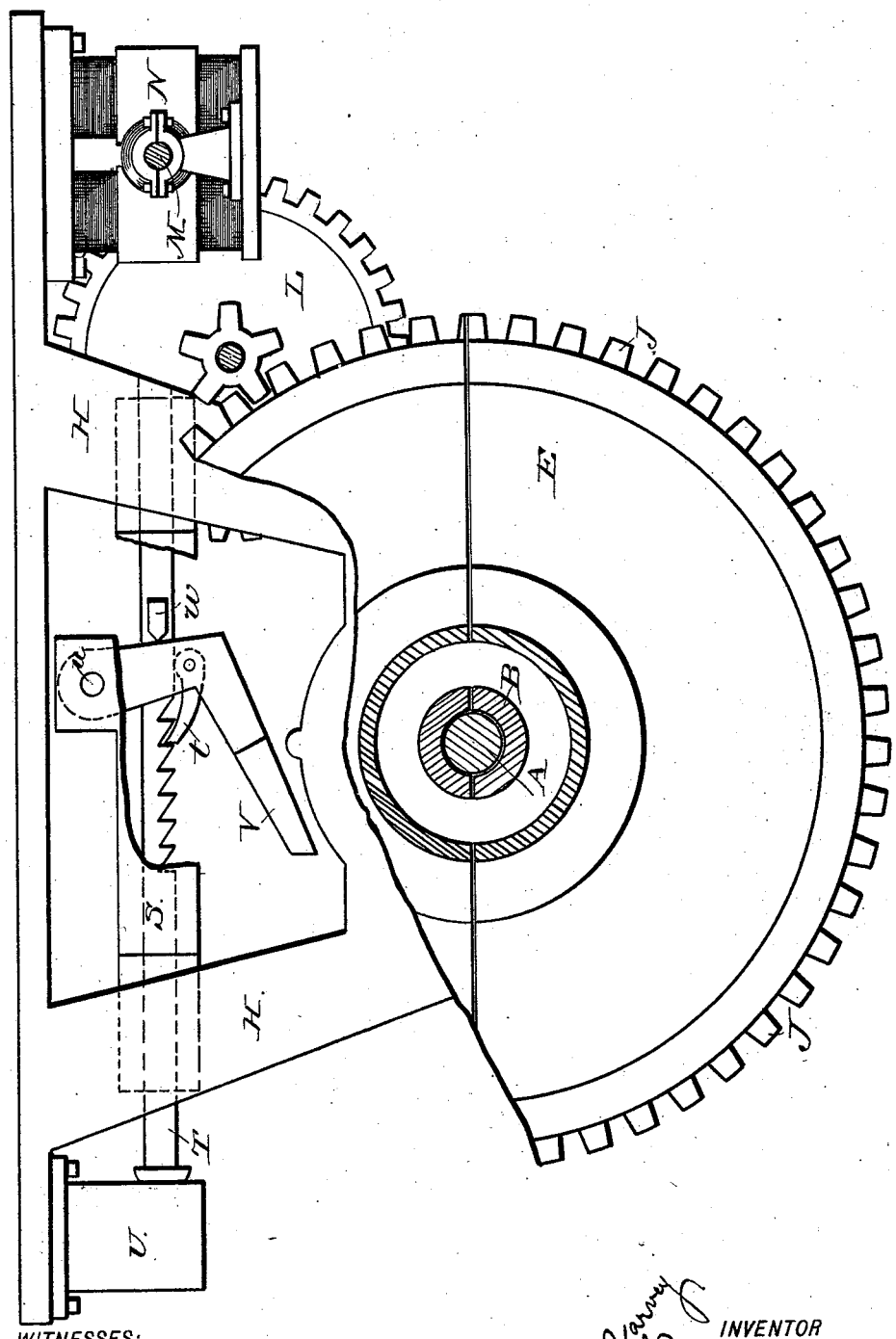

UNITED STATES PATENT OFFICE.

HARVEY S. PARK, OF CHICAGO, ILLINOIS.

MOTOR FOR STREET-CARS.

SPECIFICATION forming part of Letters Patent No. 528,796, dated November 6, 1894.

Application filed December 5, 1893. Serial No. 492,873. (No model.)

*To all whom it may concern:*

Be it known that I, HARVEY S. PARK, a citizen of the United States, residing at Chicago, in the county of Cook and State of Illinois, have invented certain new and useful Improvements in Accumulating Power with Motors; and I do hereby declare that the following is a full, clear, and exact description of the invention, which will enable others skilled in the art to which it pertains to make and use the same, reference being had to the accompanying drawings, forming a part hereof, in which—

Figure 1 is a side elevation with the axle broken off at each end. Fig. 2 is an end elevation with the axle in section and showing one wheel of the car. Fig. 3 is an end elevation with the axle and sleeve of the axle in section. Fig. 4 is a sectional elevation of the secondary motor with the axle in section and broken off at each end and a power controlling wheel or pulley, also in section. Fig. 5 is a detail in section, showing the operation of the drum and the trip arm for the drum, and showing also the rack bar and dogs for cutting the motor out of and into use. Fig. 6 is a detail showing the dogs for cutting the motor out of and into use. Fig. 7 is an elevated view with the bar S partly cut away showing stop $w$.

The propulsion of street cars after a start has been made requires only a small nominal power, but to start the car an excess of power over that required for the ordinary propulsion of the car is necessary, and if it were not for this absolute necessity for an excess of power for starting, a motor of only sufficient power to propel the car under ordinary running conditions would be all that is needed, but owing to this necessity of a large excess of power, while a one horse power motor would furnish all the power required for the ordinary propulsion of the street car when once started, in order to overcome the inertia of the car and motor, in the construction and practice now followed in propelling cars by motor power, a motor of from twenty to fifty horse power is required, because the motor comes to a stop with the stoppage of the car and a sufficient power must be had to both start the motor and overcome the inertia of the car and motor, and as a consequence an excess of power is required in starting the motor, and a further excess is necessary in starting the car. The absolute requirements of this excessive power in the present practice of propelling street cars with a motor and obtaining the excess of power required by the use of a motor of the full power necessary for starting purposes, necessitates the use of a motor car of great weight, rendering it practically impossible to stop the car with any degree of certainty within a short distance or in case of an emergency, or otherwise, and as in street car service the stops are frequent the utmost care and vigilance is required on the part of the motor man or driver in order to handle the car properly. It is therefore an absolute necessity in order to successfully operate a street car with motor power that the motor shall not be excessive in weight and also be one which will successfully attain the production of an excess of power for starting purposes and at other times when needed in propelling the car, and this invention relates to motors by means of which excessive weight for a motor car will be avoided and a motor of nominal power only needed for the propulsion of the car, and which will accumulate power in a secondary motor when the car is stopped or running at less than its ordinary rate of speed, and applying such accumulated power in starting the car and at other times when needed for the propulsion of the car.

The obtaining of an excess of power for starting purposes, and at other times when needed in propelling the car, is the primary object of the present invention, and at the same time, in accomplishing this end, to avoid the objections pertaining to the use of motors for street car service as now applied; and to this end, the invention consists broadly in using an approximately constant and continuous power for propulsion of the car, and accumulating power from such power when the car is stopped or running at less than its normal speed, and applying such accumulated power in starting the car, or at other times when needed for the propulsion of the car; and the invention further consists in a primary motor of an approximately constant speed and power for propelling the car through, or by means of the secondary motor; and a secondary motor deriving and accumulating power from such primary motor; and it further consists in combining a primary motor and a secondary motor for the primary motor to supply the power through the secondary motor, both for propelling the car when started, and to produce an accumulation of power for starting the car, or for propelling the car when more power is required; and it further consists in a power-spring connected at one end with the axle of the car, and at the other end with means for winding the spring to produce an excess of power through, or from an approximately constant speed primary power motor; and it further consists in a power-spring receiving and accumulating an excess of power, from a primary motor, connected at its inner end with the axle of the car and supported around the axle from the body of the car, allowing the car to accommodate itself to the load, and the axle to have free play; and in the engagement and disengagement of the secondary motor and the axle, and a locking attachment for the secondary motor against the transmission of power, when released from the axle; and it further consists in a clutch connection between the secondary motor and the axle, brought into engagement to apply the accumulated power, and thrown out of engagement to accumulate power in the secondary motor when the car is stopped, or running at a lower rate of speed than normal; and it further consists in the application of a resistance or a holding of the secondary motor against the transmission of power therefrom with the stoppage of the car or when running at less than normal speed, for the secondary motor to accumulate an excess of power; and it further consists in a sleeve forming a connection for the secondary motor mounted on the axle and a controlling, or power-band, acting against the sleeve when the clutch is disconnected, to hold the sleeve for the accumulation of power in the secondary motor; and it further consists in a controlling mechanism, automatically operated in connection with the primary and secondary motors to throw the primary motor into and out of use; and it further consists in a primary motor having a continuous and constant speed approximately a secondary motor receiving and storing power from the primary motor, and a controlling mechanism for the primary motor automatically operated through the secondary motor when such secondary motor has received and stored its full ratio of power or nearly so; and it further consists of a sliding bar operating a cut-out and cut in for the primary motor, a trip carried by the secondary motor, and an arm or lever moving the sliding bar; and it further consists in the several parts and combination of parts hereinafter described and pointed out in the claims as new.

In the drawings: A represents an axle of a car, having at each end a wheel, A', as shown, for running on the car track.

B is a sleeve mounted on the axle and connected with the axle for the rotation of the sleeve to impart rotation through the axle and capable of a connection from the axle so as to be held stationary. This sleeve, as shown, is made in two halves or sections, and is so made for the purpose of enabling the sleeve to be applied to axles having wheels already thereon, but for the axles on which the wheels have not been fixed the sleeve can be made in a single piece. At each end of the sleeve is a head, B', having an annular outer face, and having its inner face provided with channels, b, to receive rollers, b', which can be forced against the axle with the forward revolution of the sleeve and firmly lock the sleeve to the axle, and which when the sleeve is locked against rotation will clear themselves of engagement with the axle and allow the axle to rotate independent of the sleeve.

C are springs, two being used in the constructions shown, but more than two or a single spring can be used if desired. One end of each spring is attached by rivets, a, or otherwise to the sleeve B, and each spring is coiled around the sleeve from the attaching point.

D is the outer wall or rim of a barrel or cylinder, to which is secured the outer end of each spring C by rivets, c, or in any other suitable manner.

E is a head for the barrel or cylinder, which in the construction shown is formed with the outer wall or rim D, and the other head, E', of the barrel or cylinder is made separate and secured to the wall or rim by bolts or screws, d, or in any other suitable manner, so that the head E' is removably attached for the purpose of entering the spring into the barrel or cylinder and securing its ends to the sleeve or axle and to the barrel or cylinder.

F is a hub or journal on each head E and E', and as shown the outer rim or wall D, the heads E and E', and the journals F are made in halves for the purpose of enabling the drum or cylinder as a whole to be placed in position on the axle having wheels already thereon, but with axles on which the wheels have not been fixed, the barrel or cylinder can be formed of a single piece with a removable head E'.

G are journal boxes, one for each journal F, formed as shown, of two half boxes secured together by bolts, g', passing through ears, g, located on opposite sides of the halves on each journal box. The journals F are of a less diameter than the interior of the journal box on which they are mounted, leaving a channel, f', around each journal for a series of anti-friction rollers, f, on which rollers the journals run, but the journals could be mounted in their journal boxes without anti-friction rollers, if so desired. The rollers in the construction shown are held against outer end movement by a guard plate, e, attached to the journal boxes by bolts e', which bolts e' also assist in uniting the halves or sections of the journal boxes.

H are suspending bars or standards, with which in the construction shown, one-half or section of each journal box is formed or suitably secured.

I is a bed-plate carrying the supports or standards H and secured to the frame-work of the car by suitable bolts or otherwise, so that the hangers will suspend the journal boxes from the body of the car, and the journal boxes will carry the secondary motor, formed by the spring or springs, and the barrel or cylinder, suspended from the body of the car, and as shown each hub or journal F has a large opening F' encircling the sleeve B and leaving a clear space between the sleeve and the hub or journal, in which space the sleeve is free to play, compensating for differences in loads, and permitting the truck to accommodate itself to the inequalities of the track, and such compensation for load and inequalties of track is permitted by the flexible connection furnished by the spring or springs of the secondary motor, which allow the necessary yield without changing the relative position of the secondary motor to the primary motor.

J is a gear wheel or gear teeth located or mounted on the outer face of the rim or wall D.

K is a small gear wheel or pinion, meshing with the gear wheel or teeth J, and in order to obtain an excess of power in the secondary motor from the primary motor the ratio between J and K can be ten to one, or such other ratio as may be required for the production of the required amount of excess of power in the secondary motor necessary for starting the car, and at other times when needed.

L is a shaft, on which is secured the small gear wheel or pinion K, which shaft is mounted in boxes, $h$, secured to hangers or standards H and the shaft is held against end-thrust in the construction shown, by collars, $i$, which abut against the end of the box, $h$.

M is the motor or power-shaft, supported in boxes, $j$, on the frame of the motor in the construction shown, and as shown each end of the shaft M has thereon a gear wheel, M', which meshes with a gear wheel, L', on each end of the shaft L, so that with the rotation of the shaft M the shaft L will be rotated, and as shown the gear wheel M' is smaller than the gear wheel L', by which arrangement in connection with the gear wheels J and K a double reduction is had, but it is to be understood that instead of having a double reduction the gears could be arranged so as to produce only a single reduction.

N is the primary motor, which in the construction shown can be an electric motor having a sufficient power for propelling the car and also capable, by a constant and continuous speed, of accumulating power in the secondary motor, by revolving the barrel or cylinder so as to wind up the spring or springs of the secondary motor.

O are the speed-controlling wheels or pulleys, each having a hub or center, O', to receive the head B' and attach the wheels or pulleys one to each end of the sleeve B and as shown the head or center O' of each wheel also forms a plate for closing the channels $b'$ and retaining the clutch rollers $b$ in such channels and these wheels, in the construction shown, are made in halves or sections secured together by bolts $k$ for the purpose of attaching the pulleys or wheels to axles on which the wheels have been placed, but for axles not having the wheels fixed thereon the pulleys or wheels O could be made of a single piece.

P is a brake band or strap, one for each speed-controlling wheel or pulley O, each brake-band or strap partially encircling the wheel or pulley, as shown in Fig. 2.

Q is a link or support suspended from the bottom of the car by a half box $l$ or in any other suitable manner, and having secured to its outer or free end one end of each brake-strap or band P, as shown in Fig. 2.

R is a lever mounted on the pivot, $m$, attached to the body of the car by a support, $m'$, which lever extends up so as to be within reach of the operator of the car, and has secured to its lower end one end of each of the brake-straps or bands P, for the wheels O, as shown in Fig. 2.

S is a bar or plate extending from standard to standard H on one side of the barrel or cylinder hanger, and secured through the standard in any suitable manner.

T is a rack-bar mounted on the bar or plate S, and having a series of ratchet teeth, $n$. The rack-bar T is held in suitable guides and between one of the guides $p$ and a pin, $o'$, is a coil spring, $o$, by means of which the rack-bar will be forced back when the pawls or dogs engaging the ratchet teeth of the rack-bar are released from engagement and the extent of the receding of the rack-bar is controlled by a head, $q$, which engages the guide $p$.

U is the box or case containing the ordinary starting or controlling coil or rheostat for an electric motor, the shaft of which is connected by arms or levers, $r$, and $r'$, with the rack-bar T at the head $q$ so that the forward and back movement of the rack-bar will cut the electric motor into or out of circuit in the usual manner.

V is an arm or lever attached by a suitable pin or pivot, $u$, to an upward extension of the cross-bar, S, so that the arm or lever is free to turn or swing on its pivot $u$. This arm or lever V carries a pawl, $t$, which engages with the ratchet teeth $n$, of the rack-bar T, and the stud or pivot of the pawl $t$ carries an arm $t'$ of the form shown in Fig. 6, and as shown the pawl $t$ is held in engagement with the ratchet teeth $n$ by a spring $t''$.

The bar or plate S has mounted thereon a pawl, $s$, the stud or pivot of which carries an arm, $s'$, as shown in Fig. 6, which arm $s'$ engages with the arm $t'$ of the pawl $t$, and as shown the pawl $s$ is held in engagement with the ratchet teeth $n$ by a spring $s''$.

The spring C on the side of the drum adjacent to the rack-bar T has secured thereto an arm or trip, $x$, which passes through a slot, $y$, in the head of the barrel or cylinder, and this arm or trip $x$, when the spring is uncoiled or expanded, with the revolving of the barrel or cylinder, passes above or outside of the arms, $s'$, and $t'$, but with the contraction of the spring as it is wound up with the rotation of the barrel, and at a point where the spring has been wound near to its full extent desired, the arm or trip $x$ will be drawn inward so as to strike and partially rotate the arm $s'$ and turn or force such arm down and at the same time the arm $s'$ resting against the arm $t$, will partially rotate the arm $t'$, and force or turn the arm $t'$ down, and this movement of the arms $s'$ and $t'$ will force the pawls $s$ and $t$ from their engagement with the ratchet teeth $n$, when the spring $o$ will act and force the rack-bar T backward, moving the arms $r$ and $r'$ and cutting out the motor from the circuit so that the motor will at once stop, and with the stoppage of the motor the pawl, $z$, mounted on the hanger H and held in engagement with the teeth of the gear wheel $L'$ will hold the wheel against reaction and prevent any uncoiling of the springs or spring which would reverse the rotation of the gearing.

A pin or arm $v$ projects from one of the speed-controlling wheels or pulleys O in such relation to the arm or lever V that with the rotation of the wheel or pulley the arm or pin $v$ will strike the arm or lever V and carry such arm or lever forward, and with such forward movement of the arm or lever the pawl $t$ will be advanced one notch of the ratchet bar T, forcing the rack-bar forward the distance of a notch, and with each continued revolution of the pulley or wheel O the arm or lever V will be actuated, forcing the rack-bar T forward, moving the arms $r$ and $r'$ and gradually bringing the motor into circuit, and when the rack-bar has been fully advanced the arm or lever V will be held up clear of the arm or pin $v$ by the engagement of the stop $w$ carried by the rack-bar and advanced with each forward movement of the rack-bar so that when the motor is fully cut into circuit the rack-bar ceases to advance and the motor is free to operate.

W is the bottom of the car.

X is the track or rail on which the wheels $A'$ run.

The motor N can be an electric motor having the requisite power for propelling the car under ordinary running conditions, and this motor is attached as shown to the supporting plate I, which plate is attached to the body of the car by bolts or otherwise, so that the motors, both primary and secondary, will be suspended from the bottom or body of the car and move in unison. The primary motor N is to have the usual connections for electric motors and is operated in the usual manner by means of a resistance coil or rheostat, located in the case or box U, but as the connections, the resistance coil, and other electric devices for transmitting the current and making and breaking the circuit can be of any well known form of construction and arrangement they are neither shown nor described, and the only essential requisite is that the motor shall be a continuously operating one, except when cut out, and shall have an approximate constant and continuous speed.

The continuous and constant speed of the primary motor through the shafts M and L and gear wheels $M'$ and $L'$ rotates the gear wheel K and through the gear teeth J rotates the barrel or cylinder carrying the secondary motor, and such rotation of the secondary motor is in the direction of the travel of the car, and for ordinary running the speed of the secondary motor and the speed of the car can be the same, or the speed of the secondary motor can be varied from that of the car so long as the ratio of gearing is one to accumulate power in the secondary motor through the winding up of the spring or springs from the revolving of the barrel or cylinder.

With the stoppage of the car, or with the speed of the revolutions of the sleeve retarded, without any stoppage of the primary motor in either case must of necessity cause the primary motor to continue to revolve the barrel or cylinder, and such revolving of the barrel or cylinder constantly and continuously winds the spring, and as the spring continues to wind up it will be coiled closer, drawing its outer coil away from the outer rim or wall of the cylinder, and such drawing away will be when the spring is fully wound up or nearly so, and with the winding up of the last coil of the spring and its recession toward the center, the arm or trip $x$ which until this time has cleared the arms $s'$ and $t'$ will engage the arm $s'$ and trip the pawls $s$ and $t$ simultaneously for the spring $o$ to force the rack-bar T instantly back and at once break the circuit so that with the winding of the secondary motor to the full capacity desired the primary motor will be automatically cut out and no damage can possibly occur, and at the same time the pawl $z$ acts and prevents any recoil, holding the secondary motor in full power so that on the release of the sleeve the spring will act directly on the axle and propel the car, and with each revolution of the power or breakwheel the rack-bar will be advanced by the action of the arm or lever V cutting the electric motor partially into circuit and such advance will continue with each succeeding revolution of this wheel until the electric motor is in full circuit.

The secondary motor is held against transmission of power to the axle when the car is stopped, or at other times, by locking the sleeve B, which is accomplished by the operator on the car moving the lever R so as to bring the brake-bands or strap P in engagement with the pulley or wheel O holding the sleeve against rotation, and with such holding of the sleeve the make and break connection between the axle and the sleeve is released, and when the sleeve is locked against rotation the continuous rotation of the barrel or cylinder from the rotation of the primary motor will wind power into the secondary motor for use in starting the car and at other times when needed, and with the release of the brake-band or strap from engagement the spring at once acts on the sleeve to rotate the sleeve forward, and such rotation of the sleeve engages the clutch or other make and break connection for the axle, transmitting power from the secondary motor direct to the axle for propelling the car forward.

It will be seen that the axle has a rotation forward independent of the secondary motor in order to make and break the connection between the axle when the secondary motor is disengaged; the sleeve is locked against forward rotation when the connection between the sleeve and the axle is disengaged, that the secondary motor has a continuous and constant forward rotation until the limit of winding up has been reached when it is automatically stopped by cutting out the primary motor, and that the primary motor has a constant and continuous forward rotation until its circuit is cut out, and by this arrangement each part which transmits power has a forward rotation contingent one on the other, and yet at the same time each part is capable of being cut out or disengaged so that the rotation of one part can be stopped when necessary for the purpose of stopping the car or of stopping the motors.

It will be readily understood that the motor man or driver can control the speed of the car by the controlling wheels O, and the brake-bands or straps P, and when the bands are applied with sufficient force the sleeve B will be held against rotation from the secondary motor for the primary motor to continue to revolve and wind the springs C to their full tension, at which time the arm or trip $x$, by means of the rack-bar T will automatically cut out the primary motor; so that at this point the primary motor and the secondary motor will be at a standstill. When the force on the band P is withdrawn the torsion of the springs C will revolve the sleeve B forward, and with it the controlling wheels O and, by means of the clutch or clamp $b$, the axle and the car will move ahead. The speed of the car will be governed by the force of the bands P on the wheels O, and when the band P is entirely released the car will move with a torsion on the springs C, only sufficient to propel the car in ordinary running. The barrel D and primary motor N will not revolve until the wheels O, by means of pin $v$, lever V, rack-bar T and starting-box U have closed the circuit and started the motor; and before this occurs the revolutions of the sleeve B will have permitted a partial uncoiling of the springs C and relieved them of their greatest torsional force.

When the car has attained as great speed as is desired the driver applies the bands P to wheels O. This holds the sleeve B and axle A from revolving with the full torsion of springs C, at which time the primary motor will revolve the barrel D, by means of its gearing, faster than the sleeve B is revolving, which revolutions of the barrel D will wind the springs C to their full tension faster than the revolutions of the sleeve B permits the springs C to unwind. This is not a waste of power as would be caused by the operator or driver had he applied the brakes to the car wheels, but effects a speed-control and a storage of power in the secondary motor, which storage will continue until the springs are wound to their fullest desired tension and the primary motor is again stopped by the arm $x$, rack-bar T, starting-box U and their co-operating devices.

It will be seen that the speed of the car is entirely under the control of the driver by means of the lever R and co-acting devices; that the primary motor is controlled automatically by means of the devices for opening and closing of the electric circuit at the proper time, and that the stopping of the car for passengers or in an emergency can be had quickly as the power of the secondary motor can be taken from the axle instantly by means of lever R and co-acting parts, and the car stopped by the application of the ordinary car brake.

The primary motor is not stopped unless cut out or when an equilibrium is had and its power is being transmitted continuously to the secondary motor and there accumulated, and as the primary motor is wholly removed from any attention of the operator or driver of the car, through the automatic cut out and in of such motor, from the operation of the two motors it will be seen that the entire attention of the operator can be given to controlling the speed of the car through the lever R and to the application of the ordinary brakes to the wheels for stopping the car, thereby enabling the operator to give more attention to the operation of the car without having his attention engaged by cutting in and cutting out the primary motor.

The primary motor by its constant and continuous speed and rotation, and through the advantage of leverage which is had by reason of the increased ratio of power transmission through the gearing to the secondary motor, will operate as a retainer against any recoil of the secondary motor until the difference in leverage becomes equalized, at which time the two powers will be at an equilibrium which equilibrium will be ten to one, or such other ratio as the ratio between the gearing, and when this point is reached the motors will become stationary, but at the same time the resistance offered by the armature when in circuit will hold against any recoil of the spring, but unless the circuit was cut out such stoppage of an electric motor would create damage, and it is to avoid any damage from this cause that the automatic cut out and cut in for the primary motor is provided, and when cut out the armature would offer no resistance against the recoil of the secondary motor and to avoid damage from such recoil a pawl is provided which comes into engagement and prevents any backward revolution of the gearing, and which will hold the secondary motor under full power until released by the operator, when the power which has been accumulated in the secondary motor will be transmitted to the axle.

The primary motor shown is an electric one, but a steam or other motor can be used, and in case a steam or other motor is used the box U would inclose a cut-off valve or gear controlling the motor and operated through the arms or links $r$ $r'$, from the recession and advance of the sliding bar, the recession shunting off the supply by closing the valve, and the advance opening the supply by opening the valve.

The essential features of the invention are viz: enabling a primary motor of an approximate constant speed and power, to perform both the offices of furnishing the power needed for propelling the car under ordinary running conditions, and of furnishing the excess of power required to start the car and at other times when needed; the employment of a make and break connection between the axle and the secondary motor, which accumulates an excess of power from a primary motor, when wanted to impart revolution to the axle; and the cutting out and cutting in, or stopping and starting the primary motor automatically; and in carrying out the invention the details of construction and mode of application can be varied without departing from the spirit of the invention so long as the construction and application are such as to carry out the main idea or feature, and I do not therefore desire to confine myself strictly to such details of construction and application.

The secondary motor and the ratio of leverage between it and the primary motor can be arranged for projecting into the secondary motor when wound up to its full extent more power than required for the secondary motor to transmit, and the cut-out mechanism be made to operate at the time when the limit of power required for the secondary motor is reached in the winding, by which arrangement any overwinding of the secondary motor will be avoided, and with the reduction of power from the cut-out limit, the cut in mechanism will operate and bring the primary motor again into use.

What I claim as new, and desire to secure by Letters Patent, is—

1. A primary motor having a continuous and constant speed approximately and a secondary motor receiving and storing power from the primary motor, in combination with a controlling mechanism for the primary motor automatically operating to throw the motor out of use as the secondary motor reaches the limit of power, substantially as and for the purposes specified.

2. A primary motor having a continuous and constant speed approximately and a secondary motor receiving and storing power from the primary motor, in combination with a controlling mechanism for the primary motor automatically operating to throw the primary motor into use as the secondary motor is reduced in power from the limit of power, substantially as and for the purpose specified.

3. A primary motor having a continuous and constant speed approximately and a secondary motor receiving and storing power from the primary motor, in combination with a stop and start mechanism for the primary motor, a sliding bar actuating the stop and start mechanism and an arm or trip carried by the secondary motor and operating the sliding bar to throw the primary motor out of use, substantially as and for the purposes specified.

4. A primary motor having a continuous and constant speed approximately and a secondary motor receiving and storing power from the primary motor, in combination with a stop and start mechanism for the primary motor, a sliding bar connected with the stop and start mechanism, a spring receding the bar, and an arm or trip carried by the secondary motor operating to release the bar for the spring to act and recede the bar, throwing the primary motor out of use, substantially as specified.

5. A primary motor having a continuous and constant speed approximately and a secondary motor receiving and storing power from the primary motor, in combination with a stop and start mechanism for the primary motor, a sliding bar actuating the stop and start mechanism, ratchet teeth on the bar, a spring receding the bar, pawls engaging the ratchet teeth, and an arm or trip carried by the secondary motor, releasing the pawls for the spring to act and recede the sliding bar throwing the primary motor out of use, substantially as specified.

6. A primary motor having a continuous and constant speed approximately and a secondary motor receiving and storing power from the primary motor, in combination with a stop and start mechanism for the primary motor, a sliding bar actuating the stop and start mechanism, an arm or lever engaging and advancing the sliding bar and a pin moving with the secondary motor and operating the arm or lever, substantially as and for the purposes specified.

7. A primary motor having a continuous and constant speed approximately and a secondary motor receiving and storing power from the primary motor, in combination with a stop and start mechanism for the primary motor, a sliding bar actuating the stop and start mechanism, ratchet teeth on the sliding bar, an arm or lever, a pawl carried by the arm or lever engaging the ratchet teeth, and a pin moving with the secondary motor engaging the arm or lever and advancing the sliding bar, substantially as and for the purposes specified.

8. A primary motor having a continuous and constant speed approximately and a secondary motor receiving and storing power from the primary motor, in combination with a stop and start mechanism for the primary motor, a sliding bar actuating the stop and start mechanism, ratchet teeth on the sliding bar, pawls engaging the ratchet teeth, a trip or arm carried by the secondary motor releasing the pawls, a spring receding the sliding bar when released from the pawls, an arm or lever carrying one of the pawls, and a pin moving with the secondary motor and operating the arm or lever, substantially as and for the purposes specified.

9. A primary motor of an approximately continuous and constant speed and power, in combination with a secondary motor for receiving, storing and transmitting power from the primary motor, substantially as described.

10. In combination with a primary motor, a secondary motor-spring mounted around and having its inner end connected with a car axle and its outer end with winding mechanism, a car axle around which such spring is coiled and mounted, and winding mechanism interposed between such spring and the primary motor, substantially as described.

11. In combination with a primary motor, a secondary motor for receiving and transmittting power from the primary motor and mounted independently and loosely around a car axle, and a car axle connected with the secondary motor for receiving power therefrom, substantially as described.

12. In combination with a primary motor, a secondary motor receiving and transmitting power from the primary motor, mechanism interposed between the car axle and secondary motor to make or break the engagement of the axle and secondary motor, and a car axle around and upon which the secondary motor is mounted for receiving power from such motor, substantially as described.

13. In combination with a primary motor, a secondary motor for receiving and transmitting motion from the primary, a sleeve around the car axle connected with the secondary motor, a car axle upon which such sleeve is mounted, mechanism interposed between the axle and sleeve to make or break their connection, controlling pulley mounted upon such sleeve, and mechanism operating on such controlling pulley for changing the relative position of the sleeve and axle to effect their connection or disconnection, substantially as described.

HARVEY S. PARK.

Witnesses:
  O. W. BOND,
  M. L. PRICE.